US010822028B2

(12) United States Patent
Buchwitz et al.

(10) Patent No.: US 10,822,028 B2
(45) Date of Patent: Nov. 3, 2020

(54) STEERING SYSTEM WITH DRAG LINK

(71) Applicant: Ford Global Technologies, LLC, Dearborn, MI (US)

(72) Inventors: Joe L. Buchwitz, Huntington Woods, MI (US); Christopher Sells, Livonia, MI (US); John Wesley Stanley, Belleville, MI (US); Vijay Bokil, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 16/150,721

(22) Filed: Oct. 3, 2018

(65) Prior Publication Data

US 2020/0108864 A1    Apr. 9, 2020

(51) Int. Cl.
*B62D 7/20* (2006.01)
*B62D 3/12* (2006.01)
*B62D 1/185* (2006.01)

(52) U.S. Cl.
CPC .............. *B62D 7/20* (2013.01); *B62D 1/185* (2013.01); *B62D 3/12* (2013.01)

(58) Field of Classification Search
CPC ............. B62D 7/20; B62D 1/185; B62D 3/12
See application file for complete search history.

(56) References Cited

U.S. PATENT DOCUMENTS

| 4,347,757 A | 9/1982 | Martin | |
|---|---|---|---|
| 5,851,015 A * | 12/1998 | Klosterhaus | B62D 7/10 |
| | | | 280/93.51 |
| 5,887,671 A | 3/1999 | Yuki et al. | |
| 6,055,853 A * | 5/2000 | Roberts | G01M 17/06 |
| | | | 73/117.02 |
| 6,276,476 B1 * | 8/2001 | Farwell | B62D 1/22 |
| | | | 180/322 |
| 6,510,917 B2 | 1/2003 | Cole | |
| 7,077,234 B2 | 7/2006 | Klais et al. | |
| 7,878,517 B2 | 2/2011 | von Mayenburg et al. | |
| 8,066,092 B2 * | 11/2011 | Shimizu | B62D 1/16 |
| | | | 180/443 |
| 2005/0039278 A1 * | 2/2005 | Riach | B60B 35/14 |
| | | | 15/87 |
| 2006/0006019 A1 * | 1/2006 | Caserta | B62D 7/08 |
| | | | 180/443 |
| 2007/0029748 A1 * | 2/2007 | Baxter | B62D 7/20 |
| | | | 280/86.758 |
| 2008/0314190 A1 * | 12/2008 | Miyawaki | F16C 29/02 |
| | | | 74/496 |

(Continued)

FOREIGN PATENT DOCUMENTS

CN         206367511 U         8/2017

*Primary Examiner* — Darlene P Condra

(74) *Attorney, Agent, or Firm* — Ray Coppiellie; Bejin Bieneman PLC

(57) ABSTRACT

A steering system includes a mounting bracket, a drag link elongated from a first end rotatably coupled to the mounting bracket to a second end, a steering arm rotatably coupled to the second end, and a telescoping shaft rotatably coupled to the drag link. The drag link includes a housing and a rack slidable in the housing. The telescoping shaft is operably coupled to the drag link to slide the rack relative to the housing when the telescoping shaft rotates.

20 Claims, 5 Drawing Sheets

(56) References Cited

U.S. PATENT DOCUMENTS

| | | | |
|---|---|---|---|
| 2011/0303480 A1* | 12/2011 | Shimizu | B62D 7/224 |
| | | | 180/444 |
| 2013/0133462 A1* | 5/2013 | Yamamoto | B62D 1/184 |
| | | | 74/493 |
| 2014/0224566 A1* | 8/2014 | Buchwitz | B62D 5/04 |
| | | | 180/444 |
| 2015/0197272 A1* | 7/2015 | Nonoyama | B62D 1/065 |
| | | | 74/552 |
| 2016/0339953 A1* | 11/2016 | Park | B62D 7/1581 |
| 2017/0203783 A1* | 7/2017 | Yamashita | B62D 3/12 |
| 2017/0217475 A1* | 8/2017 | Shiina | F16D 27/02 |
| 2017/0313345 A1* | 11/2017 | Tanaka | B62D 1/184 |
| 2018/0154925 A1 | 6/2018 | Steinkogler et al. | |
| 2019/0176869 A1* | 6/2019 | Breuer | F16C 3/03 |
| 2020/0102013 A1* | 4/2020 | Sakai | B60G 7/001 |

\* cited by examiner

STEERING SYSTEM WITH DRAG LINK

BACKGROUND

Vehicles include steering systems that control the turning of wheels. Conventional steering systems include rack-and-pinion systems with or without electric power-assisted steering, recirculating ball-nut steering, and steer-by-wire systems. The steering system can include an electronic control unit (ECU) or the like that is in communication with and receives input from a vehicle computer and/or a human driver. The human driver may control the steering system via, e.g., a steering wheel.

DETAILED DESCRIPTION

Figure 1:
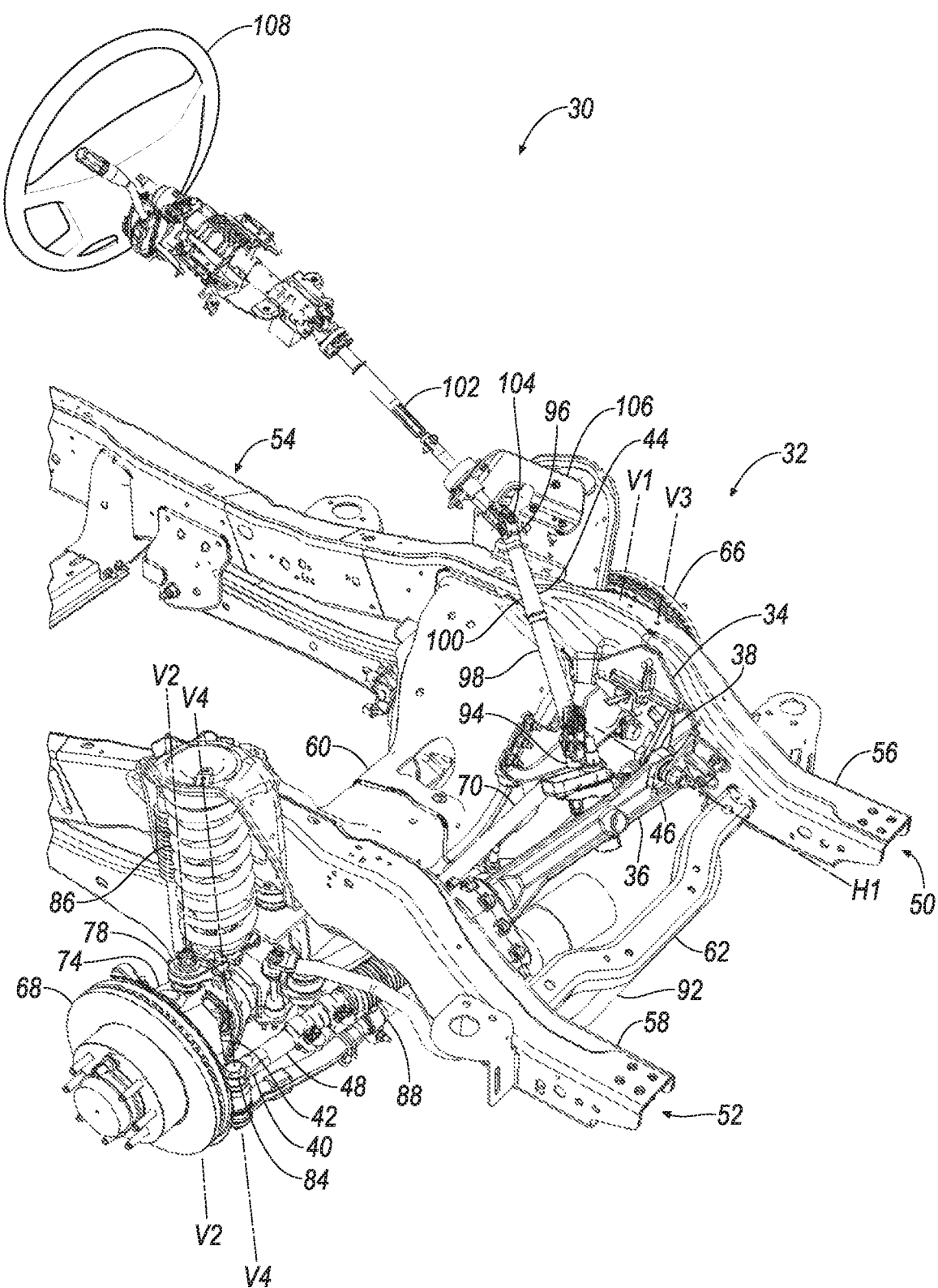
FIG. 1 is a perspective view of a vehicle chassis and steering system.
Figure 2:
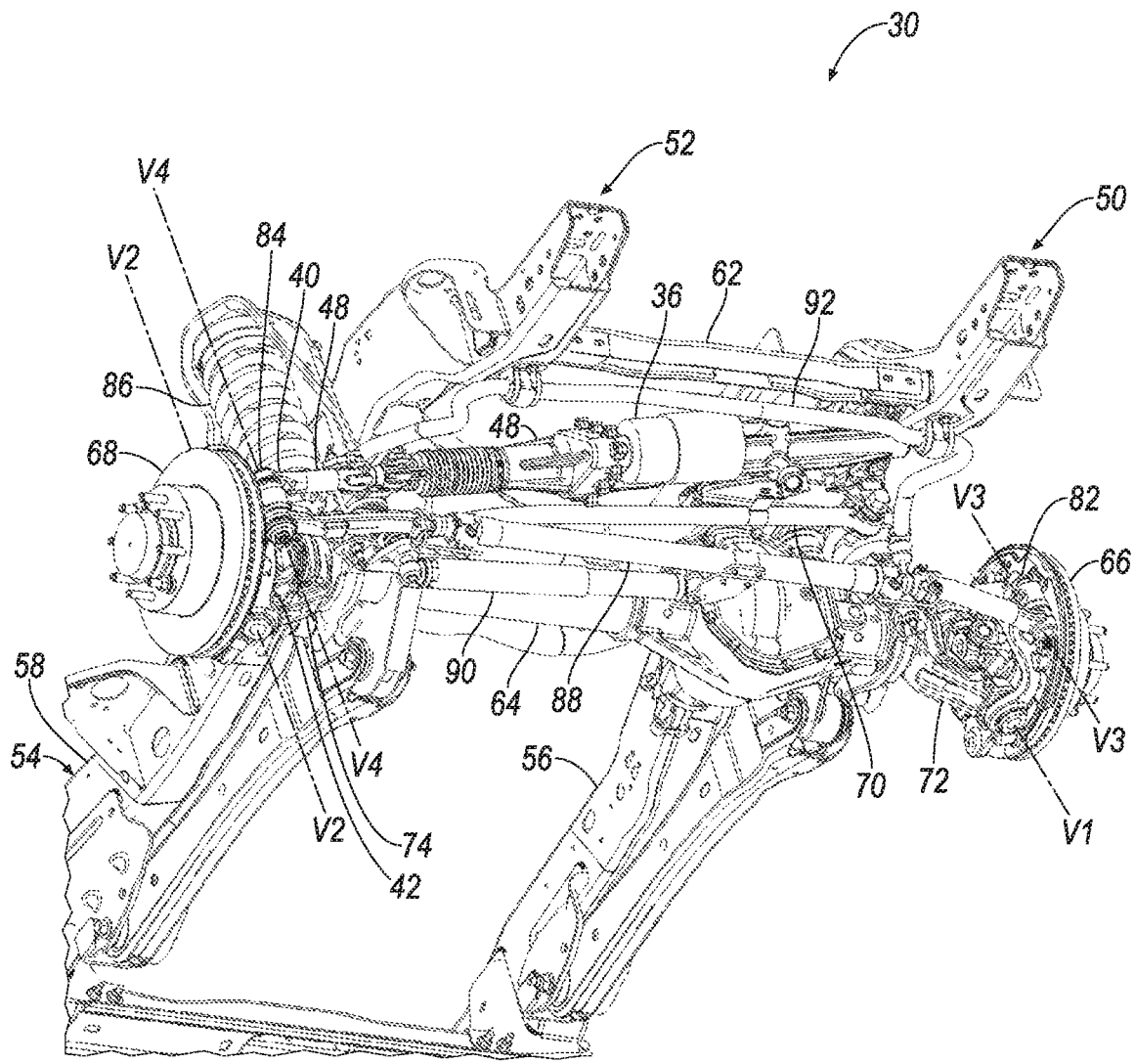
FIG. 2 is a bottom perspective view of the vehicle chassis and steering system of FIG. 1.

A steering system includes a mounting bracket, a drag link elongated from a first end rotatably coupled to the mounting bracket to a second end, a steering arm rotatably coupled to the second end, and a telescoping shaft rotatably coupled to the drag link. The drag link includes a housing and a rack slidable in the housing. The telescoping shaft is operably coupled to the drag link to slide the rack relative to the housing when the telescoping shaft rotates.

The steering system may further include a steering shaft coupled to and rotatable with the telescoping shaft. The steering shaft may be translationally fixed relative to the mounting bracket.

The steering system may further include a steering-shaft bracket fixing a position of the steering shaft relative to the mounting bracket.

The steering system may further include a steering wheel fixed relative to the steering shaft.

The steering system may further include a pinion rotatable with the telescoping shaft and meshed with the rack.

The steering system may further include an electric linear actuator fixed to the housing and drivably coupled to the rack. The linear actuator may include a ball screw.

The linear actuator may include an electric motor fixed to the housing.

The steering system may further include a chassis including two rails, and the mounting bracket may be mounted to one of the rails. The steering system may further include a wheel turnable by the steering arm, and a solid axle rotatably coupled to the chassis and supporting the wheel.

The rails may include a first rail and a second rail, the mounting bracket may be mounted to the first rail, the steering arm may be closer to the second rail than to the first rail, and the telescoping shaft may be closer to the first rail than to the second rail. The steering system may further include a pinion rotatable with the telescoping shaft and meshed with the rack, and the pinion may be closer to the first rail than to the second rail.

The steering arm may be a second steering arm, the steering system may further include a crossover link rotatably coupled to the second steering arm, and a first steering arm rotatably coupled to the crossover link.

One of the housing and the rack may include the first end of the drag link, and the other of the housing and the rack may include the second end of the drag link.

A vehicle includes a mounting bracket, a drag link elongated from a first end rotatably coupled to the mounting bracket to a second end, a steering arm rotatably coupled to the second end, a telescoping shaft rotatably coupled to the drag link, a steering shaft rotatable with the telescoping shaft, a steering-shaft bracket fixing a position of the steering shaft relative to the mounting bracket, and a steering wheel fixed relative to the steering shaft.

With reference to the Figures, a steering system 32 for a vehicle 30 includes a mounting bracket 34, a drag link 36 elongated from a first end 38 rotatably coupled to the mounting bracket 34 to a second end 40, a second steering arm 42 rotatably coupled to the second end 40, and a telescoping shaft 44 rotatably coupled to the drag link 36. The drag link 36 includes a housing 46 and a rack 48 slidable in the housing 46. The telescoping shaft 44 is operably coupled to the drag link 36 to slide the rack 48 relative to the housing 46 when the telescoping shaft 44 rotates.

The steering system 32 can provide convenient packaging in vehicles 30 with a solid axle 64 and/or a body-on-frame construction. The motion of the steering system 32 fits well and provides smooth suspension motion with other components such as with a panhard rod 70, which is often used for vehicles 30 with a solid axle 64. The steering system 32 can provide low compliance. The steering system 32 combines well with electric power-assisted steering.

Figure 3:
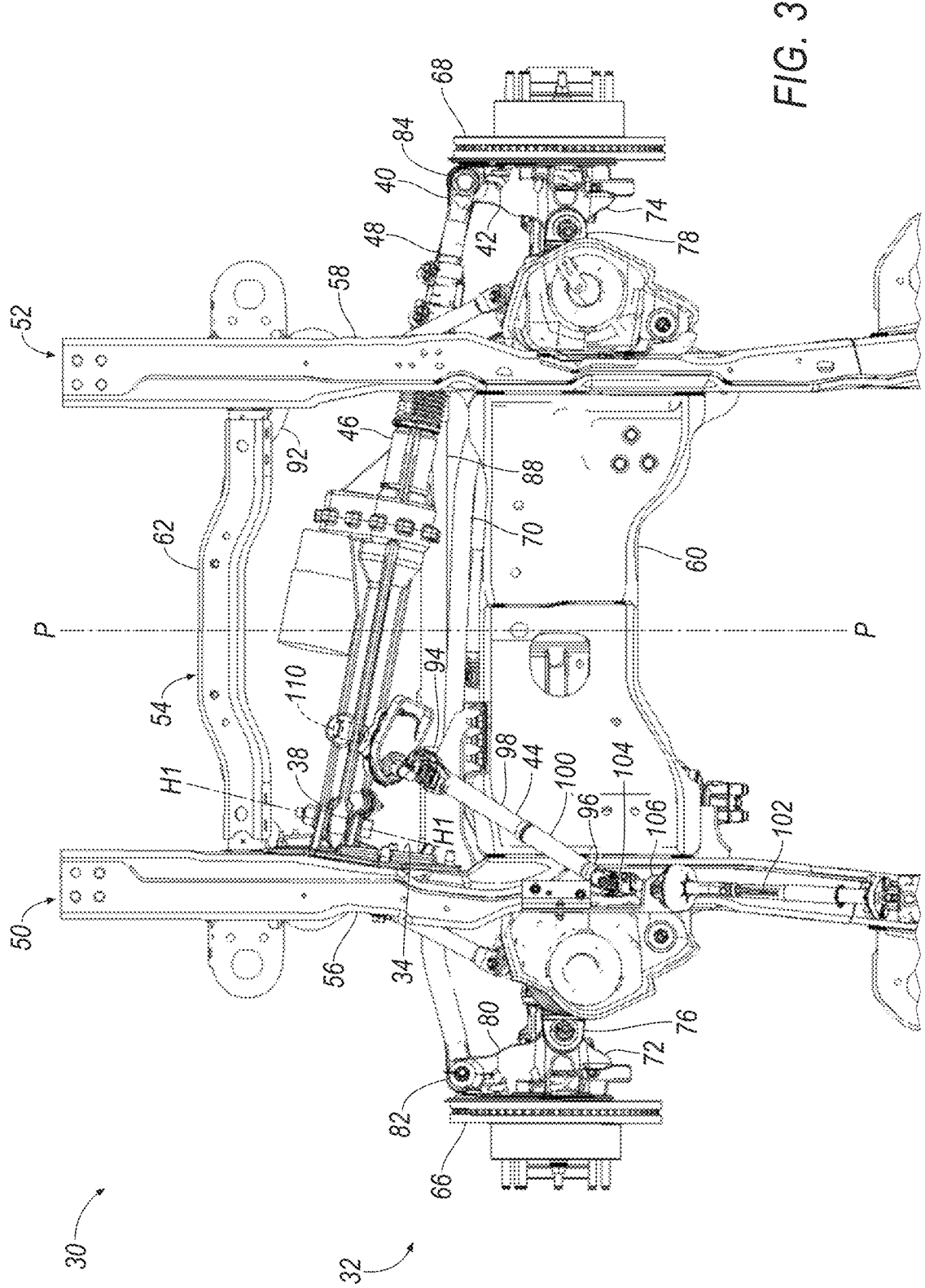
FIG. 3 is a top view of the vehicle chassis and steering system of FIG. 1.
Figure 4:
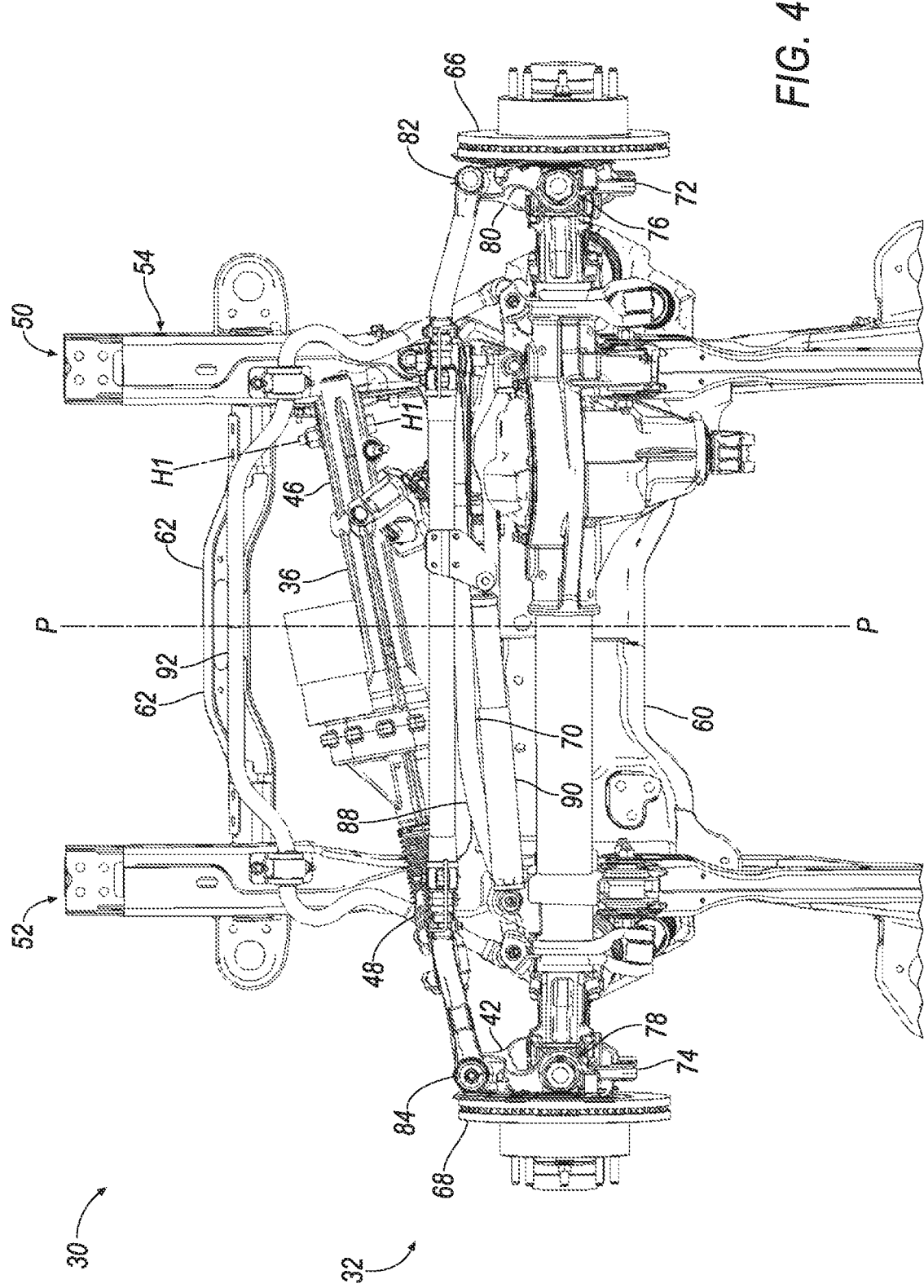
FIG. 4 is a bottom view of the vehicle chassis and steering system of FIG. 1.

With reference to FIGS. 1-4, the vehicle 30 may be any passenger or commercial automobile such as a car, a truck, a sport utility vehicle, a crossover, a van, a minivan, a taxi, a bus, etc. The vehicle 30 may include a left side 50 and a right side 52, divided from each other by a plane P extending longitudinally and vertically through a middle of the vehicle 30, as best seen in FIGS. 3 and 4. Components described below as being on the left side 50 or right side 52 may all be flipped to the other side, e.g., for vehicles 30 sold in countries in which it is customary to drive on the left side of the road rather than the right side of the road.

The vehicle 30 includes a chassis 54. The vehicle 30 may be of a body-on-frame construction, in which the chassis 54 supports a body (not shown) that is a separate component from the chassis 54, as shown in the Figures. The vehicle 30 may, alternatively, be of a unibody construction, in which the chassis 54 and the body of the vehicle 30 are a single component. The chassis 54 and body may be formed of any suitable material, for example, steel, aluminum, etc.

The chassis 54 includes two rails 56, 58, a first rail 56 and a second rail 58. The first and second rails 56, 58 are elongated longitudinally along the vehicle 30. The first rail 56 may extend along the left side 50 of the vehicle 30, and the second rail 58 may extend along the right side 52 of the vehicle 30, as shown in the Figures, or vice versa. An axle crossmember 60 and a front crossmember 62 are elongated laterally from the first rail 56 to the second rail 58. The axle crossmember 60 may be positioned directly above an axle 64. The front crossmember 62 is forward of the axle crossmember 60. The crossmembers 60, 62 may be attached to the rails 56, 58 with fasteners, welding, etc.

The axle 64 is rotatably coupled to the chassis 54. The axle 64 is cylindrical and elongated laterally relative to the chassis 54. The axle 64 may be a solid axle, i.e., the same axle 64 is drivably coupled to a first wheel 66 on the left side 50 of the vehicle 30 and to a corresponding second wheel 68 on the right side 52 of the vehicle 30. The axle 64 supports the wheels 66, 68.

A panhard rod 70 is coupled to and elongated from the chassis 54 to the axle 64. The panhard rod 70 provides lateral stability to the axle 64 relative to the chassis 54. The panhard rod 70 may be rotatably attached to the chassis 54 on the left side 50 of the vehicle 30, i.e., closer to the first rail 56 than to the second rail 58, and the panhard rod 70 may be rotatably attached to the axle 64 on the right side 52 of the vehicle 30, i.e., closer to the second rail 58 than to the first rail 56, as shown in the Figures, or vice versa.

The first wheel 66 is rotatably coupled to a first knuckle 72, and the second wheel 68 is rotatably coupled to a second knuckle 74. The first knuckle 72 is rotatably coupled to the axle 64 to rotate about a substantially vertical axis V1 at a first knuckle-axle joint 76. The second knuckle 74 is rotatably coupled to the axle 64 to rotate about a substantially vertical axis V2 at a second knuckle-axle joint 78. The first knuckle 72 includes a first steering arm 80 extending from the first knuckle-axle joint 76 to a first knuckle-crossover joint 82, and the second knuckle 74 includes the second steering arm 42 extending from the second knuckle-axle joint 78 to a second knuckle-crossover joint 84.

A suspension assembly 86 extends from each of the first and second knuckles 72, 74 to the chassis 54. The suspension assemblies 86 absorb and dampen shocks and vibrations from the wheels 66, 68 to the chassis 54. The suspension assemblies 86 permit the axle 64 to move vertically relative to the chassis 54. The suspension assemblies 86 may be any suitable type for a solid-axle design, e.g., four link, three link, leaf spring, radius arm, etc.

A crossover link 88 is rotatably coupled to the first steering arm 80 and to the second steering arm 42 at the first and second knuckle-crossover joints 82, 84. Alternatively, the crossover link 88 may be rotatably coupled to the drag link 36 instead of to the second steering arm 42. The crossover link 88 is rotatable relative to the first steering arm 80 and relative to the second steering arm 42 about substantially vertical axes V3, V4 at the knuckle-crossover joints 82, 84. The crossover link 88 may have a fixed length from the first knuckle-crossover joint 82 to the second knuckle-crossover joint 84. The chassis 54, the first steering arm 80, the second steering arm 42, and the crossover link 88 constitute a four-bar linkage. Rotation of one of the steering arms 42, 80 relative to the chassis 54 causes lateral motion of the crossover link 88, which causes rotation of the other of the steering arms 42, 80 relative to the chassis 54.

The mounting bracket 34 is mounted to the first rail 56. The mounting bracket 34 may be mounted on an inside face of the first rail 56. The mounting bracket 34 may be attached, e.g., fastened, welded, etc. to the first rail 56. The mounting bracket 34 may be disposed between the axle crossmember 60 and the front crossmember 62.

The drag link 36 is elongated from the first end 38 to the second end 40. The first end 38 is rotatably coupled to the mounting bracket 34. The drag link 36 may be rotatable relative to the mounting bracket 34 at the first end 38 in one degree of freedom about a substantially horizontal axis H1. The second end 40 is rotatably coupled to the second steering arm 42 at the knuckle-crossover joint. The drag link 36 may be rotatable relative to the second steering arm 42 about the same substantially vertical axis V3 as the crossover link 88.

A steering damper 90 may be rotatably coupled to the crossover link 88 and to the axle 64 or to the chassis 54. The steering damper 90 is telescoping, i.e., has a variable length. The steering damper 90 absorbs energy from changing length, which can reduce oscillations through the steering system 32. The steering damper 90 may alternatively be rotatably coupled to the drag link 36 or another component that moves with the turning of the wheels 66, 68 instead of to the crossover link 88.

A stabilizer bar 92 is rotatably coupled to the chassis 54 below the front crossmember 62 and rotatably coupled to the axle 64 on the left side 50 and to the axle 64 on the right side 52. The stabilizer bar 92 includes a middle section elongated below the front crossmember 62 and lever arms extending from the middle section to the axle 64 on the left side 50 and on the right side 52. The stabilizer bar 92 is rotatable relative to the chassis 54 about a substantially horizontal, lateral axis H1 defined by the middle section of the stabilizer bar 92. The stabilizer bar 92 can reduce body roll of the vehicle 30 by transmitting vertical motion of one of the wheels 66, 68 to the other of the wheels 66, 68.

The telescoping shaft 44 is elongated from a first end 94 coupled to the drag link 36 to a second end 96. The first end 94 of the telescoping shaft 44 is rotatably coupled to the drag link 36. The telescoping shaft 44 is rotatable relative to the drag link 36 about an axis defined by its direction of elongation. The telescoping shaft 44 is telescoping, i.e., has a variable length. The telescoping shaft 44 may include an inner section 98 and an outer section 100 positioned concentrically about the inner section 98 and inside which the inner section 98 is slidable.

A steering shaft 102 is coupled to and rotatable with the telescoping shaft 44. The second end 96 of the telescoping shaft 44 may be coupled to the steering shaft 102 with a universal joint 104, i.e., a joint of two hinges defining substantially perpendicular axes of rotation. Rotation of the steering shaft 102 about its length is thus transmitted to rotation of the telescoping shaft 44 about its length.

The steering shaft 102 is translationally fixed relative to the chassis 54 and thus relative to the mounting bracket 34. A steering-shaft bracket 106 is attached to the chassis 54, e.g., to the first rail 56, and fixes a position of the steering shaft 102 relative to the chassis 54. The steering-shaft bracket 106 permits rotation of the steering shaft 102 about its length and prevents movement in other degrees of freedom. The steering-shaft bracket 106 may be fastened, welded, etc. to the chassis 54, e.g., to the first rail 56.

A steering wheel 108 is fixed relative to the steering shaft 102. The steering wheel 108 allows an operator to steer the vehicle 30. The steering wheel 108 may be a rigid ring rotatable with the steering shaft 102.

Figure 5:
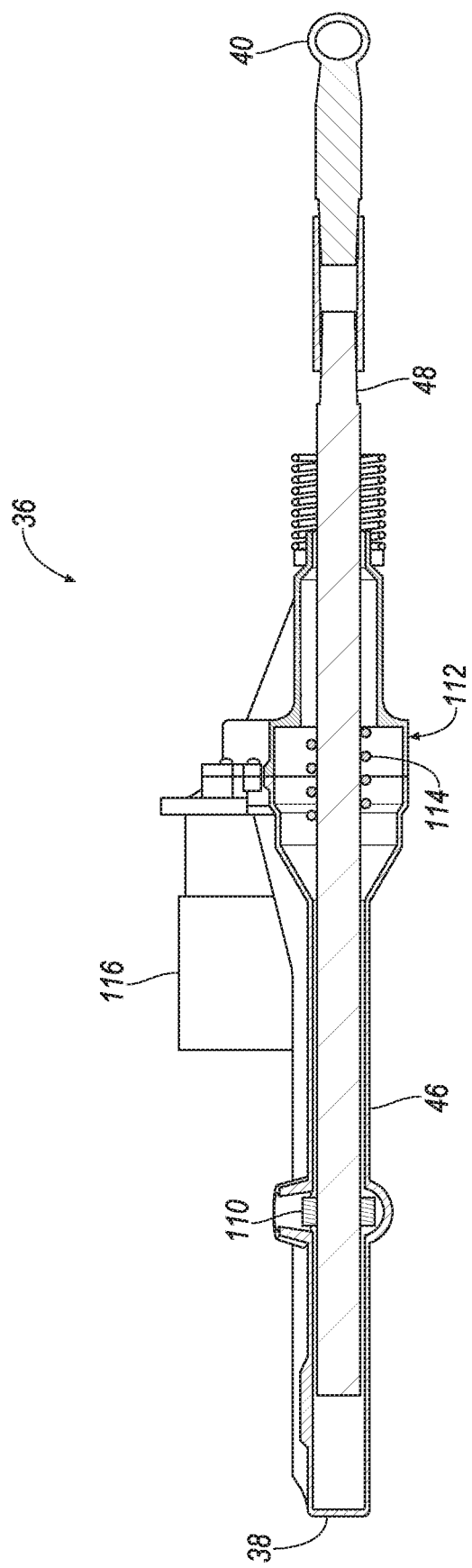
FIG. 5 is a cross-sectional view of a drag link of the steering system of FIG. 1.

With reference to FIG. 5, the drag link 36 includes the housing 46, the rack 48, and a pinion 110. The rack 48 is slidable within the housing 46, and the housing 46 may block other degrees of freedom of the rack 48 relative to the housing 46. One of the housing 46 and the rack 48 includes the first end 38 of the drag link 36, and the other of the housing 46 and the rack 48 includes the second end 40 of the drag link 36. As shown in the Figures, the housing 46 includes the first end 38 of the drag link 36, and the rack 48 includes the second end 40 of the drag link 36.

The telescoping shaft 44 is operably coupled to the drag link 36 to slide the rack 48 relative to the housing 46 when the telescoping shaft 44 rotates. The telescoping shaft 44 may be operably coupled to the drag link 36 via the pinion 110. The pinion 110 may be rotatable within the housing 46. The pinion 110 may be meshed with the rack 48, i.e., may include gear teeth meshed with gear teeth of the rack 48, converting rotational motion of the pinion 110 relative to the housing 46 into translational motion of the rack 48 relative to the housing 46. The pinion 110 is disposed on the left side 50 of the vehicle 30, i.e., the same side of the vehicle 30 as the telescoping shaft 44, i.e., closer to the first rail 56 than to the second rail 58.

A linear actuator 112 may be fixed to the housing 46 and drivably coupled to the rack 48. For example, the linear actuator 112 may include a ball screw 114, i.e., a mechanism in which the motion of ball bearings through a threaded shaft causes translation of the threaded shaft, which may be fixed to the rack 48. The linear actuator 112 may include an electric motor 116 fixed to the housing 46, e.g., for driving the ball screw 114 or equivalent mechanism. The linear actuator 112 may provide electric power-assisted steering, i.e., the linear actuator 112 may translate the rack 48 in the direction indicated by motion of the steering wheel 108, making the steering wheel 108 easier for an occupant to rotate. The linear actuator 112 may be in communication with a sensor (not shown) detecting motion of the steering wheel 108 or the steering shaft 102, e.g., a rotary encoder, a Hall effect sensor, etc.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A steering system comprising:
   a mounting bracket;
   a drag link elongated from a first end rotatably coupled to the mounting bracket to a second end, the drag link including a housing and a rack slidable in the housing;
   a steering arm rotatably coupled to the second end; and
   a telescoping shaft rotatably coupled to the drag link, wherein the telescoping shaft is operably coupled to the drag link to slide the rack relative to the housing when the telescoping shaft rotates;
   wherein one of the housing and the rack includes the first end of the drag link, and the other of the housing and the rack includes the second end of the drag link.

2. The steering system of claim 1, further comprising a steering shaft coupled to and rotatable with the telescoping shaft.

3. The steering system of claim 2, wherein the steering shaft is translationally fixed relative to the mounting bracket.

4. The steering system of claim 2, further comprising a steering-shaft bracket fixing a position of the steering shaft relative to the mounting bracket.

5. The steering system of claim 4, wherein the steering-shaft bracket is fixed relative to the mounting bracket.

6. The steering system of claim 2, further comprising a steering wheel fixed relative to the steering shaft.

7. The steering system of claim 1, further comprising a pinion rotatable with the telescoping shaft and meshed with the rack.

8. The steering system of claim 1, further comprising an electric linear actuator fixed to the housing and drivably coupled to the rack.

9. The steering system of claim 8, wherein the linear actuator includes a ball screw.

10. The steering system of claim 8, wherein the linear actuator includes an electric motor fixed to the housing.

11. The steering system of claim 1, further comprising a chassis including two rails, wherein the mounting bracket is mounted to one of the rails.

12. The steering system of claim 11, further comprising a wheel turnable by the steering arm, and a solid axle rotatably coupled to the chassis and supporting the wheel.

13. The steering system of claim 11, wherein the rails include a first rail and a second rail, the mounting bracket is mounted to the first rail, the steering arm is closer to the second rail than to the first rail, and the telescoping shaft is closer to the first rail than to the second rail.

14. The steering system of claim 13, further comprising a pinion rotatable with the telescoping shaft and meshed with the rack, wherein the pinion is closer to the first rail than to the second rail.

15. The steering system of claim 1, wherein the steering arm is a second steering arm, the steering system further comprising a crossover link rotatably coupled to the second steering arm, and a first steering arm rotatably coupled to the crossover link.

16. A vehicle comprising:
    a mounting bracket;
    a drag link elongated from a first end rotatably coupled to the mounting bracket to a second end;
    a steering arm rotatably coupled to the second end;
    a telescoping shaft rotatably coupled to the drag link;
    a steering shaft rotatable with the telescoping shaft;
    a steering-shaft bracket fixing a position of the steering shaft relative to the mounting bracket;
    a steering wheel fixed relative to the steering shaft; and
    the steering-shaft bracket is fixed relative to the mounting bracket.

17. The vehicle of claim 16, further comprising a vehicle frame to which the mounting bracket is fixed and the steering-shaft bracket is fixed.

18. A steering system comprising:
    a mounting bracket;
    a drag link elongated from a first end rotatably coupled to the mounting bracket to a second end, the drag link including a housing and a rack slidable in the housing;
    a steering arm rotatably coupled to the second end;
    a telescoping shaft rotatably coupled to the drag link, wherein the telescoping shaft is operably coupled to the drag link to slide the rack relative to the housing when the telescoping shaft rotates; and
    a steering shaft coupled to and rotatable with the telescoping shaft;
    wherein the steering shaft is translationally fixed relative to the mounting bracket.

19. The steering system of claim 18, further comprising a steering-shaft bracket fixing a position of the steering shaft relative to the mounting bracket.

20. The steering system of claim 18, further comprising a steering wheel fixed relative to the steering shaft.

* * * * *